(12) United States Patent
Tada (10) Patent No.: US 11,007,963 B2
(45) Date of Patent: May 18, 2021

(54) WORK VEHICLE HAVING ROPS

(71) Applicant: KUBOTA CORPORATION, Osaka (JP)

(72) Inventor: Hiroyuki Tada, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 60 days.

(21) Appl. No.: 16/233,853

(22) Filed: Dec. 27, 2018

(65) Prior Publication Data
US 2020/0207300 A1    Jul. 2, 2020

(51) Int. Cl.
*B60R 21/13* (2006.01)
*A01D 34/00* (2006.01)
*F16C 11/10* (2006.01)
*A01D 43/063* (2006.01)
*A01D 101/00* (2006.01)
*A01D 34/66* (2006.01)

(52) U.S. Cl.
CPC .......... *B60R 21/131* (2013.01); *A01D 34/001* (2013.01); *F16C 11/10* (2013.01); *A01D 34/66* (2013.01); *A01D 43/063* (2013.01); *A01D 2101/00* (2013.01)

(58) Field of Classification Search
CPC ............... B60R 21/131; A01D 34/001; A01D 2101/00; A01D 43/063; A01D 34/66; F16C 11/10
See application file for complete search history.

(56) References Cited

U.S. PATENT DOCUMENTS

| 5,503,430 | A | 4/1996 | Miki et al. | |
|---|---|---|---|---|
| 6,334,366 | B1 * | 1/2002 | Schuler | B60R 21/13 280/756 |
| 6,352,285 | B1 * | 3/2002 | Schulte | B60R 21/13 280/756 |
| 7,971,904 | B2 | 7/2011 | David | |
| 8,033,573 | B2 * | 10/2011 | Beki | B60R 21/13 180/69.21 |
| 8,905,434 | B1 * | 12/2014 | Bartel | B60R 21/131 280/756 |
| 9,511,735 | B2 * | 12/2016 | Schlup, Jr. | B60R 21/131 |
| 9,616,837 | B1 * | 4/2017 | Bartel | B60R 21/131 |
| 2011/0095514 | A1 * | 4/2011 | McCord | B60R 21/131 280/756 |
| 2016/0057924 | A1 * | 3/2016 | Asahara | B62D 49/00 180/6.5 |
| 2018/0037183 | A1 * | 2/2018 | Bartel | A01D 34/824 |
| 2019/0126876 | A1 * | 5/2019 | Mayefske | B60R 21/131 |

* cited by examiner

*Primary Examiner* — Darlene P Condra
(74) *Attorney, Agent, or Firm* — Greenblum & Bernstein, P.L.C.

(57) ABSTRACT

A work vehicle includes a vehicle body frame extending in a vehicle body front/rear direction, a front wheel unit and a rear wheel unit attached to the vehicle body frame, a driver's seat disposed upwardly of the vehicle body frame, a ROPS and and an operational tool operable by a driver seated at the driver's seat. The ROPS includes a pair of left and right lower portions fixed to the vehicle body frame and an upper portion supported to the lower portions to be pivotable between a vertical posture and a horizontal posture about a pivot shaft extending in a vehicle body transverse direction, an actuator unit for generating power, and an operational mechanism configured to pivot the upper portion with using the power. The actuator is controlled by the operational tool.

8 Claims, 10 Drawing Sheets

WORK VEHICLE HAVING ROPS

TECHNICAL FIELD

This invention relates to a work vehicle having a collapsible ROPS (rollover protection system).

BACKGROUND ART

A ROPS for a work vehicle according to U.S. Pat. No. 5,503,430 includes a pair of left and right lower portions bent from vicinity of a transmission to extend upwards and a portal-shaped upper portion. Base ends of the lower portions are fixed to a vehicle body frame. Left and right lower ends of the upper portion are connected to upper ends of the respective lower portions to be pivotable respectively about a horizontal axis between a vertical position and a horizontal position and fixed thereto by being fastened with connecting bolts. At respective connecting portions of the lower portions and the upper portion, there are provided engaging portions and engaged portions engageable in opposition to each other in the direction of the horizontal axis. Under a free state wherein the fastening between the lower portions and the upper portion is released, the engaging portions and the engaged portions are separated from each other in an engagement releasing direction by means of springs. With this, the upper portion is rendered freely pivotable. By fixing the lower portions and the upper portion with bolt fastening at a desired pivotal position of the upper portion, the ROPS is set at a desired height.

A ROPS for a work vehicle according to U.S. Pat. No. 7,971,904 includes a pair of left and right lower portions, a portal-shaped upper portion, and pivot brackets connecting lower ends of the upper portion to upper ends of the lower portions to be pivotable between a front upper position and a rear lower positon (about 180 degrees). The lower portions have their lower ends fixed to a vehicle body frame and bent upwards to extend from the horizontal. For locking the upper portion at the front upper position, lock pins extending through the upper portion and the lower portions are employed.

With the ROPS's disclosed in U.S. Pat. Nos. 5,503,430 and 7,971,904, if there is possibility of interference of the upper portion by e.g. a branch of a tree in the course of traveling with the upper portion being pivoted upwards, the driver firstly needs to get off the vehicle to pivot the upper portion upwards. Then, the driver needs to get on the vehicle to resume an ongoing (interrupted) utility work.

SUMMARY OF THE INVENTION

An object of the present invention is to provide a work vehicle having a collapsible ROPS, which allows pivotally lowering the upper portion of the ROPS without needing the driver's getting off the vehicle.

A work vehicle according to the present invention comprises a vehicle body frame extending in a vehicle body front/rear direction, a front wheel unit and a rear wheel unit attached to the vehicle body frame, a driver's seat disposed upwardly of the vehicle body frame, a ROPS and and an operational tool operable by a driver seated at the driver's seat. The ROPS includes a pair of left and right lower portions fixed to the vehicle body frame and an upper portion supported to the lower portions to be pivotable between a vertical posture and a horizontal posture about a pivot shaft extending in a vehicle body transverse direction, an actuator unit for generating power, and an operational mechanism configured to pivot the upper portion with using the power. The actuator is controlled by the operational tool.

With the above-described arrangement, when the driver kept seated at the driver's seat operates the operational tool, the actuator unit is driven to generate a power. With receipt of this power from the actuator unit, the operational mechanism pivots the upper portion from the vertical posture (upper position) to the horizontal posture (lower position) or reversely from the horizontal posture to the vertical posture. Thus, even if an obstacle is present ahead of the work vehicle which may interfere with the upper portion assuming the vertical posture, the driver may remain seated and can operate the operational tool, optionally while traveling. With this operation of the operational tool alone, the upper portion can be pivoted to the horizontal posture to avoid interference with the obstacle.

The actuator unit and the operational mechanism can be realized in various forms. As a work vehicle mounts a battery, an electrically powered cylinder and an electric motor can be employed preferably. As the operational mechanism, a wire mechanism or a link mechanism configured to convert a movement of the actuator unit into a pivotal movement of the upper portion may be used advantageously. If an electric motor is employed as the actuator unit, the arrangement for providing operable connection, preferably direct operable connection, between a pivot shaft of the upper portion and an output shaft of the electric motor can reduce the number of components together constituting the operational mechanism advantageously.

DETAILED DESCRIPTION

Next, with reference to the accompanying drawings, there will be explained a mower as an example of a work vehicle having a ROPS relating to the invention. In the following detailed description, unless indicated explicitly otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
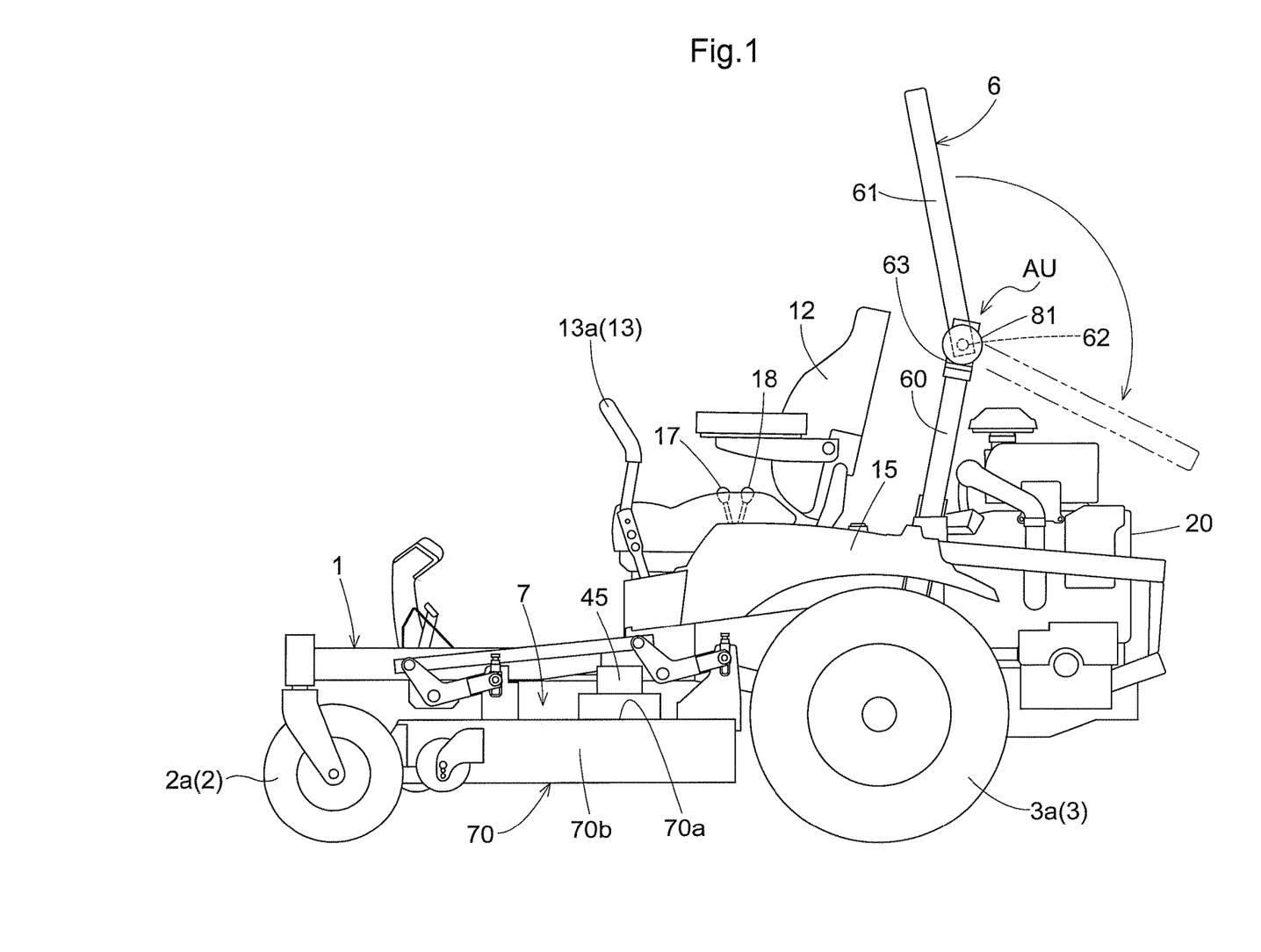
FIG. 1 is a side view of a mower.
Figure 2:
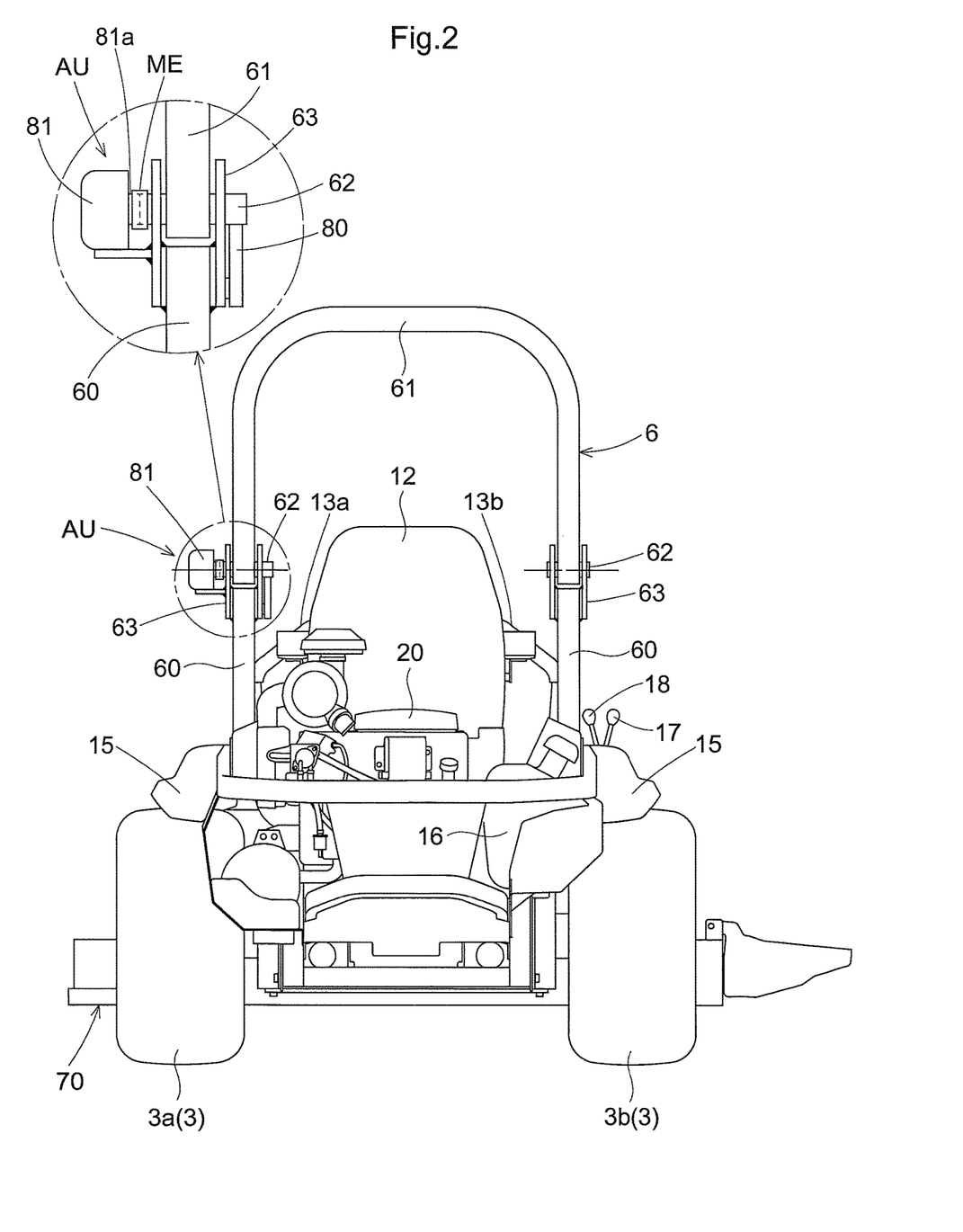
FIG. 2 is a rear view of the mower.

FIG. 1 is a side view of the mower. FIG. 2 is a rear view of the mower. This mower, as shown in FIG. 1 and FIG. 2, includes a vehicle body frame 1 supported on the ground surface by a front wheel unit 2 as a caster unit and a rear wheel unit 3 as driven wheels. The vehicle body frame 1 includes left and right main frames extending in a vehicle body front/rear direction and cross beams extending in a vehicle body transverse direction to interconnect the left and right main frames. The main frames and the cross beams are constituted of plate members and/or pipe members. This mower is configured as a so-called "zero-turn mower", with a left rear wheel 3a and a right rear wheel 3b together constituting the rear wheel unit 3 being adjustable in their forward and reverse speeds independently of each other. The front wheel unit 2 includes a left front wheel 2a and a right front wheel (not shown) as caster (free-rotating) wheels.

The left front wheel 2a and the right front wheel are coupled to the front end of the vehicle body frame 1. Between the front wheel unit 2 and the rear wheel unit 3, a mower deck 70 of a mower unit 7 is suspended from the vehicle body frame 1 to be freely lifted up/down relative thereto. The mower deck 70 consists of a top plate 70a and a side plate 70b, with forming a grass cutting (mowing) space therein. The mower deck 70 is switchable between a side discharge type and a mulching type.

At a rear portion of the vehicle body frame 1, there are disposed an engine 20 as an internal combustion engine and engine accessory devices. The engine 20 is disposed under a posture with an engine output shaft 21 (see FIG. 3) protruding downwards. Laterally of the engine 20, a fuel tank 16 is disposed.

On the left and right opposed sides of the driver's seat 12, fenders 15 are provided. In the upper faces of these fenders 15, user operational devices such as various kinds of operational levers, operational buttons, etc. are disposed. On the rear side of the driver's seat 12, an arch-shaped ROPS 6 is mounted vertically.

This ROPS 6 is a collapsible type. The ROPS 6 includes a pair of left and right lower portions 60, an upper portion 61, pivot shafts 62, an actuator unit AU and an operational mechanism ME. The lower portions 60 are fixed either directly or indirectly via supports to the vehicle body frame 1. and extend upwards like posts. Each pivot shaft 62 is attached to the corresponding lower portion 60 via a bracket 63 to extend horizontally in the vehicle body transverse direction. The upper portion 61 is a portal-shaped frame with its lower ends connected to the lower portions 60 via the pivot shafts 62. Each pivot shaft 62 is pivoted to the bracket 63 which in turn is fixed to the lower end of the lower portion 60. With this arrangement, the upper portion 61 is pivotable about the pivot shafts 62 between a vertical posture which is the forward pivotal limit position (tilted by about 10 degrees to the front side in the example shown in FIG. 1) and a horizontal position which is the rearward pivotal limit position (tilted further downwards by about 10 degrees from the horizontal posture in the example shown in FIG. 1).

In the instant embodiment, an electric motor 81 is employed as the actuator unit AU. Therefore, the operational mechanism ME for pivoting the upper portion 61 with using power of the electric motor 81 is a connecting body for connecting an output shaft 81a of the electric motor 81 to the pivot shaft 62. In case the output shaft 81a of the electric motor 81 and the pivot shaft 62 are not coaxial, the operational mechanism ME will be configured as a gear mechanism or a chain mechanism for transmitting power from the output shaft 81a to the pivot shaft 62.

An operational tool 17 is disposed on the fender 15. This operational tool 17 is operable by a driver seated at the driver's seat 12. Based on an operation on the operational tool 17, driving of the electric motor 81 as the actuator unit AU is controlled, so that the posture of the upper portion 61 is switched over.

Further, in the peripheral area of the pivot shaft 62, there is provided a lock mechanism 80 for locking the pivot shaft 62 or the upper portion 61 when the upper portion 61 is switched to the vertical posture. Such lock mechanism 80 per se is well-known in the art, so detailed discussion thereof is omitted herein. For instance, the lock mechanism can be a ratchet mechanism, a cam mechanism, a solenoid mechanism, etc. The lock mechanism 80 in a simple form can be realized by a lock pin which is to be inserted into and withdrawn from lock holes defined in the upper portion 61 and the lower portion 60. In this case, insertion/withdrawal of the lock pin can be done by a solenoid mechanism or can be done manually by a driver via a wire.

A maneuvering unit 13 consists of a left maneuvering lever 13a disposed on the left side of the driver's seat 12 and a right maneuvering lever 13b disposed on the right side of the driver's seat 12 (see FIG. 2). The left maneuvering lever 13a is used for adjusting a rotational speed of the left rear wheel 3a. The right maneuvering lever 13b is used for adjusting a rotational speed of the left rear wheel 3b. These left and right maneuvering levers 13a and 13b are pivotally displaceable among a forward speed changing range, a neutral and a reverse speed changing range.

Figure 3:
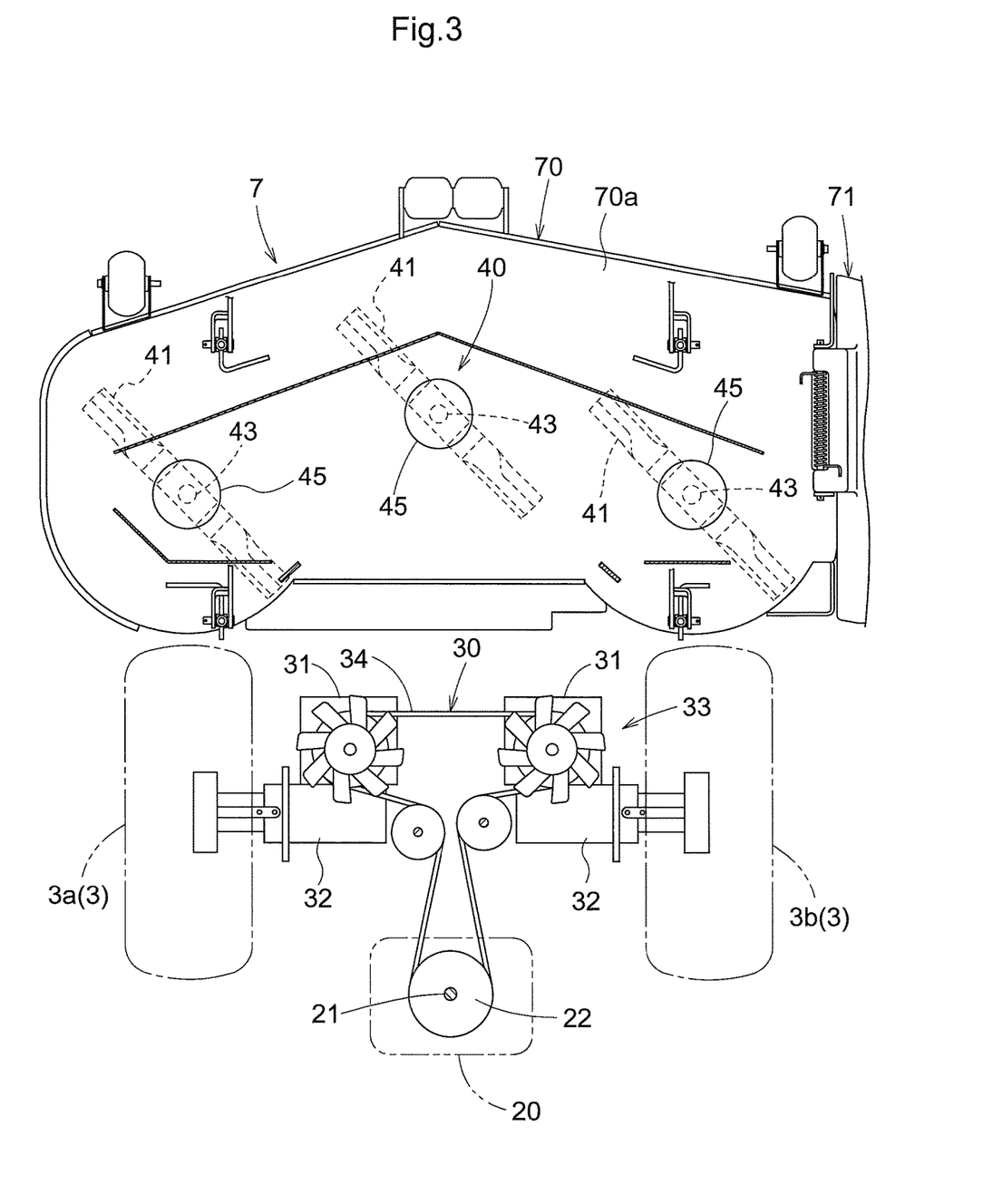
FIG. 3 is a diagram of a power transmission system of the mower.

FIG. 3 shows a traveling transmission mechanism 30 and a blade rotation mechanism 40. The power from the engine 20 is outputted via an output pulley 22 attached to the engine output shaft 21 to the traveling transmission mechanism 30.

The traveling transmission mechanism 30 includes a pair of left and right HST's (hydrostatic transmission) 31, a pair of left and right gear transmission mechanisms 32 and a traveling belt transmission mechanism 33. The traveling belt transmission mechanism 33 is configured to transmit power outputted via the output pulley 22 attached to the engine output shaft 21 to the respective HST's 31 via a traveling belt 34. The gear transmission mechanisms 32 transmit powers speed-changed through the HST's 31 to the left rear wheel 3a and the right rear wheel 3b respectively.

The speed changing operations by the left and right HST's 31 are effected by control signals generated based on pivotal operations on the left maneuvering lever 13a and the right maneuvering lever 13b, respectively. In response to user operations on the left maneuvering lever 13a and the right maneuvering lever 13b, there are realized a stopped state, a straight traveling state, a gentle turning state, a pivot turning state and a spin turning state, respectively. The straight traveling state is realized by driving the left rear wheel 3a and the right rear wheel 3b together at an equal speed forwardly or reversely. The gentle turning state is realized by driving the left rear wheel 3a and the right rear wheel 3b at different speeds from each other forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other reversely.

Figure 4:
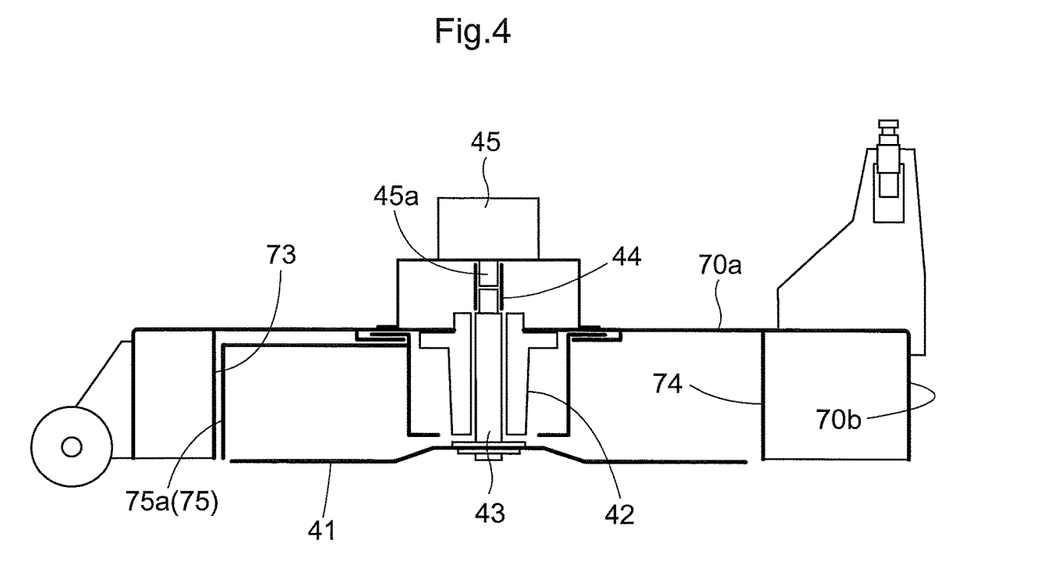
FIG. 4 is a section view of a mower deck.

As shown in FIG. 3 and FIG. 4, in an inner space of the mower deck 70, there are provided three blades 41 disposed side by side in the vehicle body transverse direction. These three blades 41 are disposed in such a manner to cooperate to obtain an uninterrupted continuous cutting width in the vehicle body transverse direction.

Each blade 41 is fixed to a lower end of a rotational shaft 43 extending in the vertical direction. The rotational shaft 43 extends through the top plate 70a of the mower deck 70 to be pivotally supported by a bearing bracket 42 fixed to the top plate 70a. The upper end of the rotational shaft 43 extending upwards from the bearing bracket 42 is directly connected via a coupling 44 to an output shaft 45 of an electrically driven blade motor 45.

In the instant embodiment, for each blade 41, the one blade motor 45 is provided respectively. Instead of this, an alternative arrangement is possible in which the one blade motor 45 is directly connected only to the rotational shaft 43 of a particular blade 41 and power is transmitted from this rotational shaft 43 to the other rotational shafts 43 with using a belt transmission mechanism. With such rotation of the blades 41 using electric motors, it is possible to obtain a rotational speed more stable than a rotational speed obtained with using the engine 20, so that there can be achieved an advantageous effect of reducing noise such as buzzing or howling wind noise of the blades 41.

Figure 5:
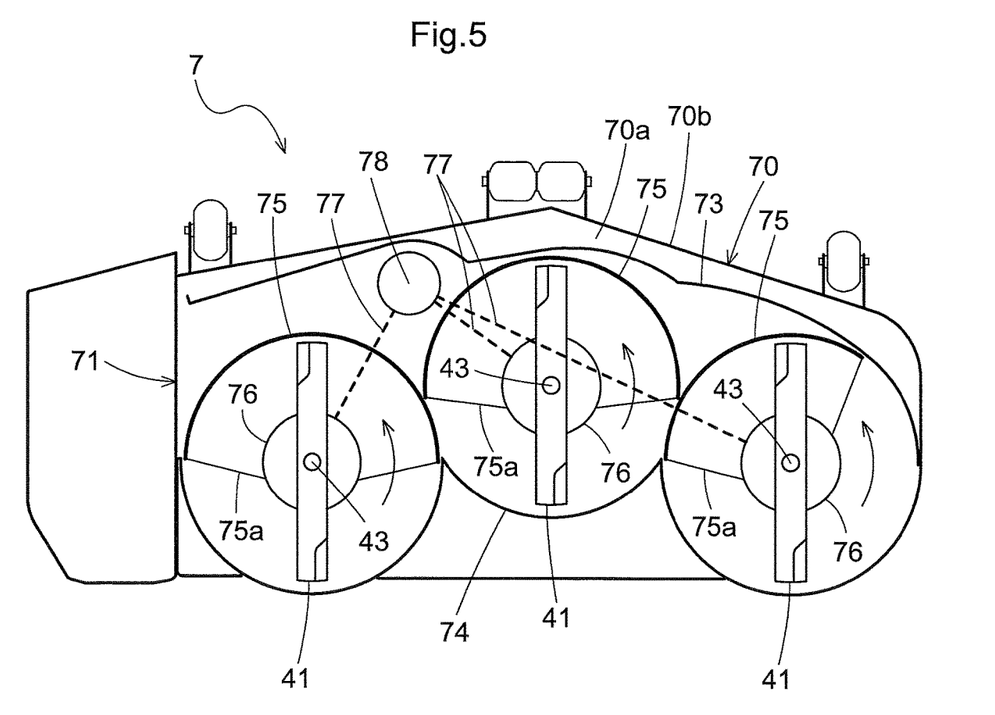
FIG. 5 is a bottom view showing the mower deck which is switched to a mulching type.
Figure 6:
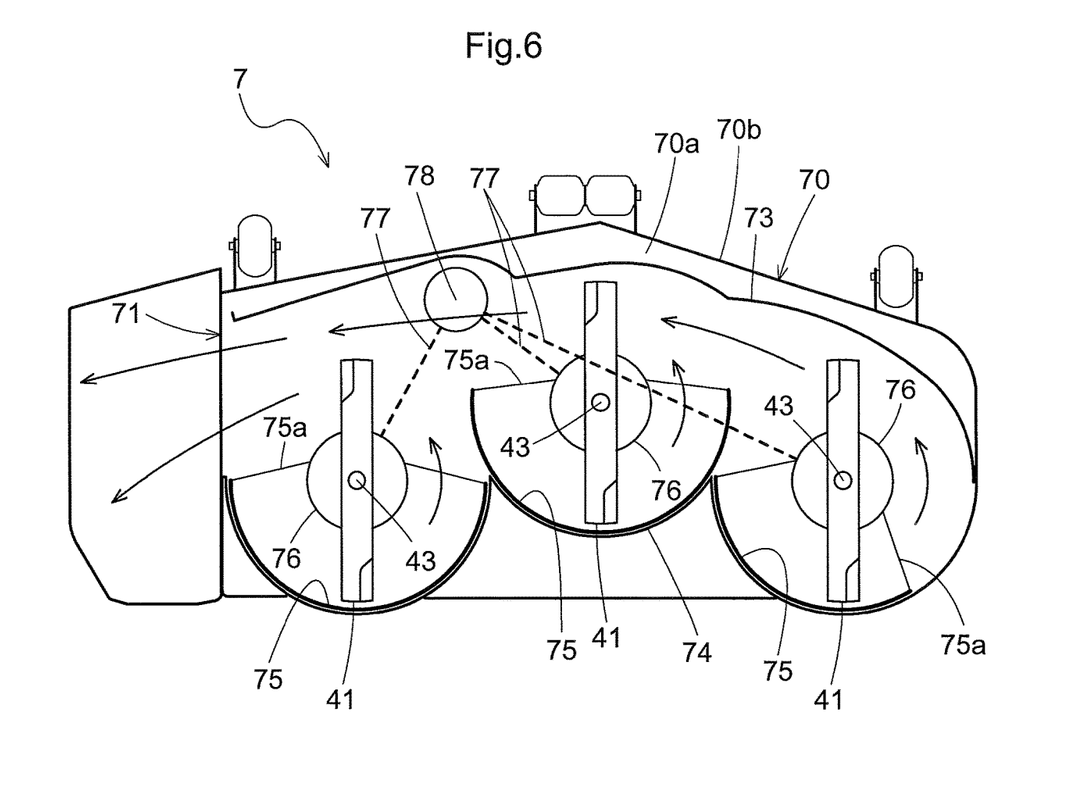
FIG. 6 is a bottom view showing the mower deck which is switched to a side discharge type.

The mower unit 7 of this mower can be switched to either a mulching type shown in FIG. 5 or to a side discharge type shown in FIG. 6. In the mulching type, grass clippings cut by the blades 41 will be further cut for several additional times and then allowed to fall onto the ground surface. In the side discharge type, grass clippings cut by the blades 41 will be discharged from the mower deck 70 through a discharge opening 71 formed in the lateral side of the mower deck 70.

As shown in FIG. 5 and FIG. 6, to a lower face of the ceiling plate 70a of the mower deck 70, there are attached a front baffle 73 and a rear baffle 74 in the form of curved plates. The front baffle 73 has a shape which follows front side rotational paths of the three blades 43 and which also causes the cut grass clippings to flow to the discharge opening 71. The rear baffle 74 has a shape which substantially coincides with the rear rotational paths of the three blades 41.

Further, to the lower face of the top plate 70a, there are also provided movable baffles 75 which are pivotable about the respective rotational shafts 43 via respective boss members 76. A movement of a baffle actuator 78 is transmitted via a power transmission member 77 to a rotational portion of a boss member 76. More particularly, with actuation of the baffle actuator 78, the movable baffle 75 is set to a rotational position for the mulching type shown in FIG. 4 or to a rotational position for the side discharge type shown in FIG. 6.

When the mower unit 7 is set to the mulching type (FIG. 5), each movable baffle 75 surrounds the rotational path of the corresponding blade 41 in cooperation with the rear baffle 74 (or in cooperation with the front baffle 73 in the case of the left blade). In the case of the left blade, the front baffle 73 is utilized also for its cooperative surrounding. With this arrangement, scattering of grass clippings cut by the respective blade 41 is prevented by each movable baffle 75, the rear baffle 74 and the top plate 70a, but will be minced by the blade 41. Whereas, when the mower unit 7 is set to the side discharge type (FIG. 6), each movable baffle 75 will be overlapped with the rear baffle 74, so grass clippings will be allowed to be scattered to the outside of the rotational path of the blade 41. More particularly, the front side region between the front baffle 72 and the rear baffle 74 will form a passageway for grass clippings cut by the blade 41, so the grass clippings will be discharged via the discharge opening 71.

As the baffle actuator 78, an electric motor or an electrically powered cylinder will be employed. In case an electric motor is employed, the power transmission member 77 will be configured to convert a rotational displacement of the electric motor into a rotational displacement of the rotational portion of the boss member 76. Whereas, in case an electrically powered cylinder is employed, the power transmission member 77 will be configured to convert a reciprocal displacement of the electrically powered cylinder into a rotational displacement of the rotational portion of the boss member 76. Further, if such electric motor or electrically powered cylinder is employed for each one of the three movable baffles 75, the power transmission member 77 can be constituted of a gear unit alone.

A switchover lever 18 for switching over between the side discharge type and the mulching type is disposed on the fender 15. This switchover lever 18 is operable by a driver seated at the driver's seat 12. Based on an operation on this switchover lever 18, driving of the baffle actuator 78 is controlled, so that the mower 7 will be switched to either the mulching type or the side discharge type.

Figure 7:
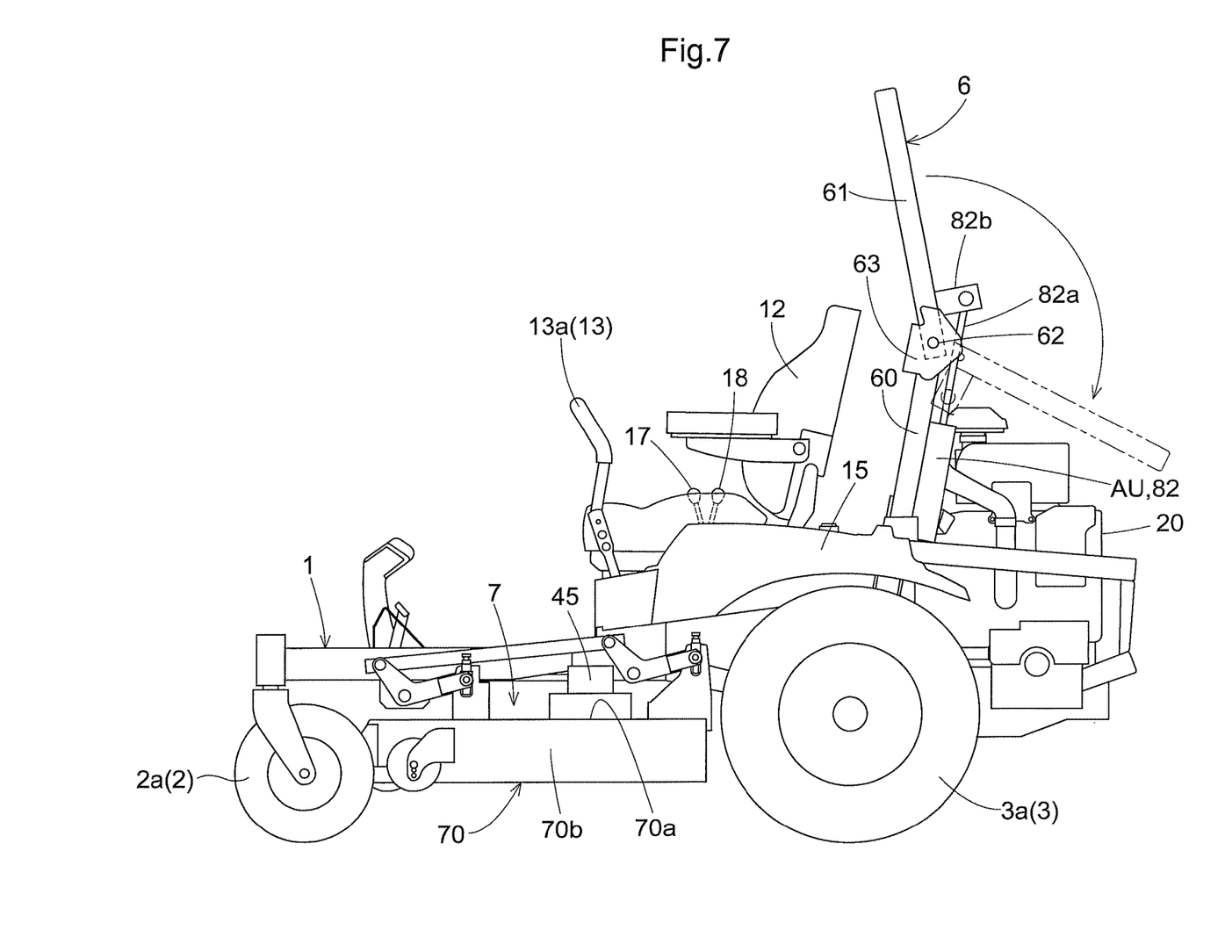
FIG. 7 is a side view of a mower according to a further embodiment.
Figure 8:
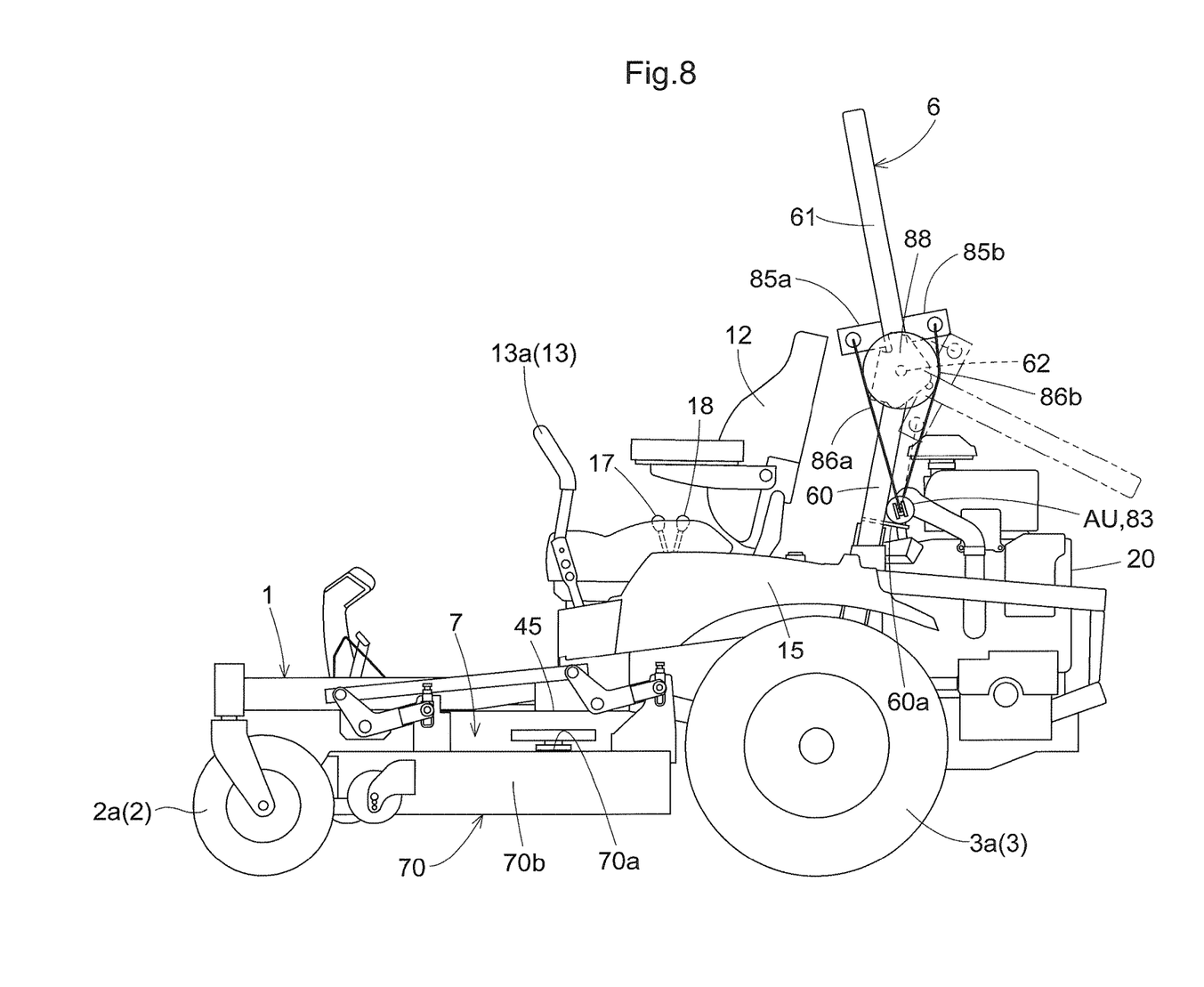
FIG. 8 is a side view of a mower according to a still further embodiment.

In the above-described embodiment of the ROPS 6, the electric motor 81 is employed as the actuator unit AU. FIG. 7 and FIG. 8 show further embodiments using an electrically powered cylinder 82 as the actuator unit AU, instead of the above. In the case of the further embodiment shown in FIG. 7, a single-rod type electrically powered cylinder 82 is attached to the lower portion 60 and a bracket 82b connected to the cylinder rod 82a is attached to the upper portion 61. When the cylinder rod 82a is expanded, the upper portion 61 is pivoted to the vertical position which is the forward pivotal limit position. When the cylinder rod 82a is contracted, the upper portion 61 is pivoted to the horizontal position which is the rearward pivotal limit position.

Figure 9:
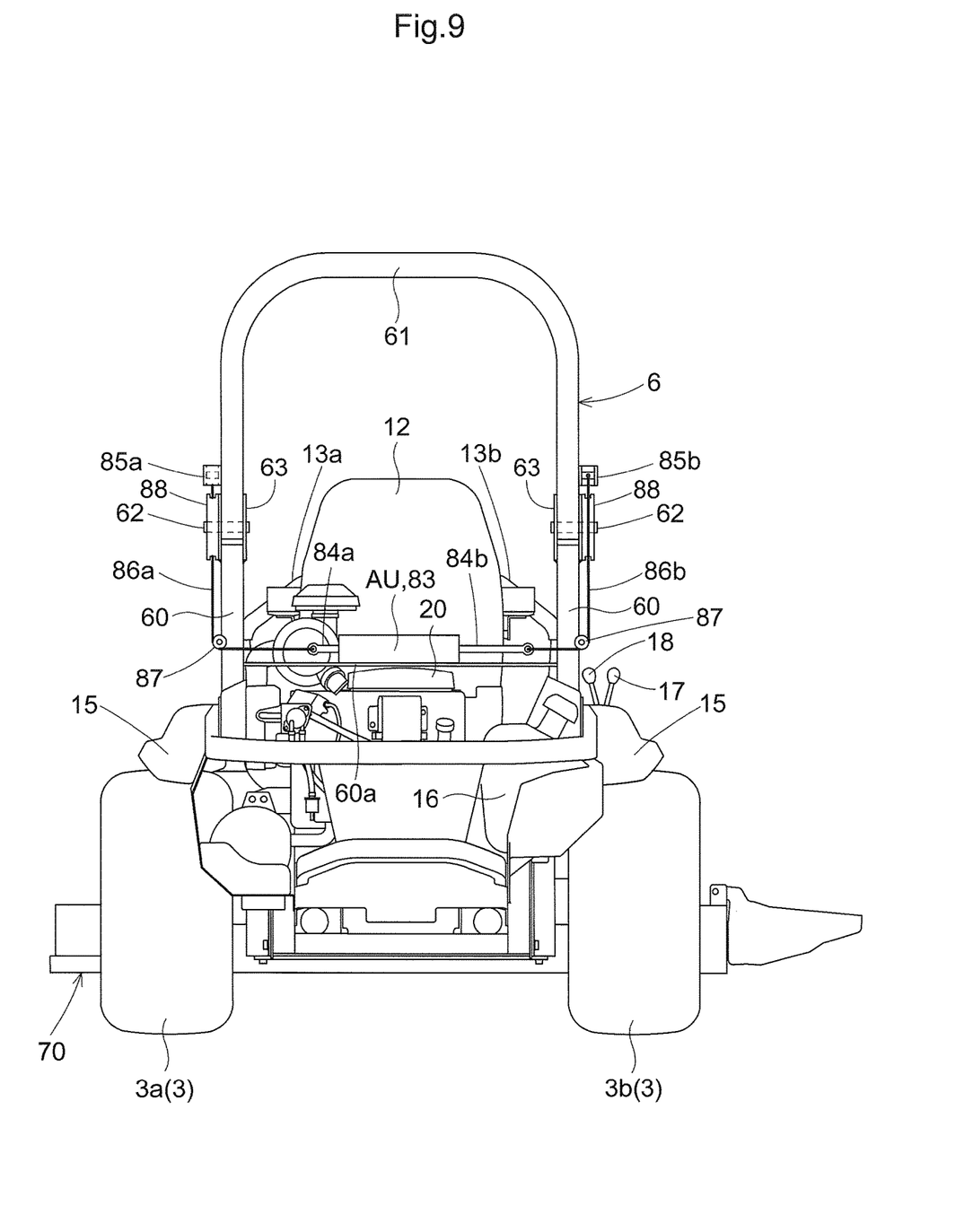
FIG. 9 is a rear view of the mower shown in FIG. 8.
Figure 10:
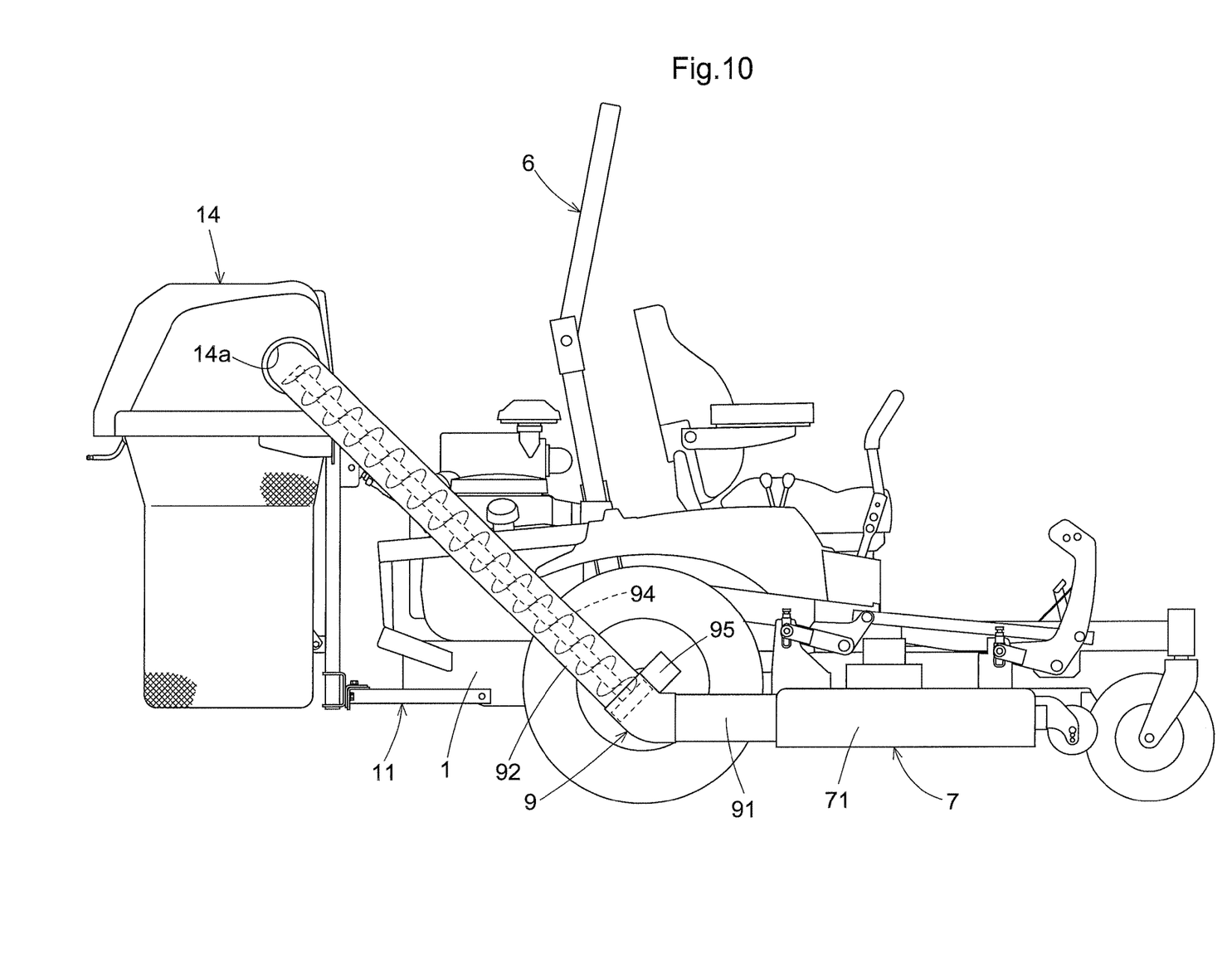
FIG. 10 is a side view of a mower having a conveying duct and a grass collecting container.

In the further embodiment shown in FIG. 8 and FIG. 9, as the actuator unit AU, a double-rod type electrically powered cylinder 83 is employed. In this further embodiment, the electrically powered cylinder 83 is attached with horizontal orientation to a cross bar 60a which bridges between the left and right lower portions 60. To the left and right leg portions of the upper portion 61, there are attached a left arm 85a and a right arm 85b protruding from these leg portions respectively. A left rod 84a of the electrically powered cylinder 83 and the left arm 85a are connected to each other via a left wire 86a which is turned by 90 degrees by a direction changer 87. Similarly, a right rod 84b of the electrically powered cylinder 83 and the right arm 85b are connected to each other via a right wire 86b which is turned by 90 degrees by a direction changer 87. In this arrangement, when the left rod 84a of the electrically powered cylinder 83 is expanded and the right rod 84b thereof is contracted, the right wire 86b is tensed while the left wire 86a is loosened, whereby the upper portion 61 is pivoted to the horizontal position which is the rearward pivotal limit position. Conversely, when the left rod 84a of the electrically powered cylinder 83 is contracted and the right rod 84b thereof is expanded, the left wire 86a is tensed while the right wire 86b is loosened, whereby the upper portion 61 is pivoted to the vertical position which is the forward pivotal limit position. A disc-like guide member 88 is provided for appropriately holding windings of the left wire 86a and the right wire 86b in the course of movements thereof.

Figure 11:
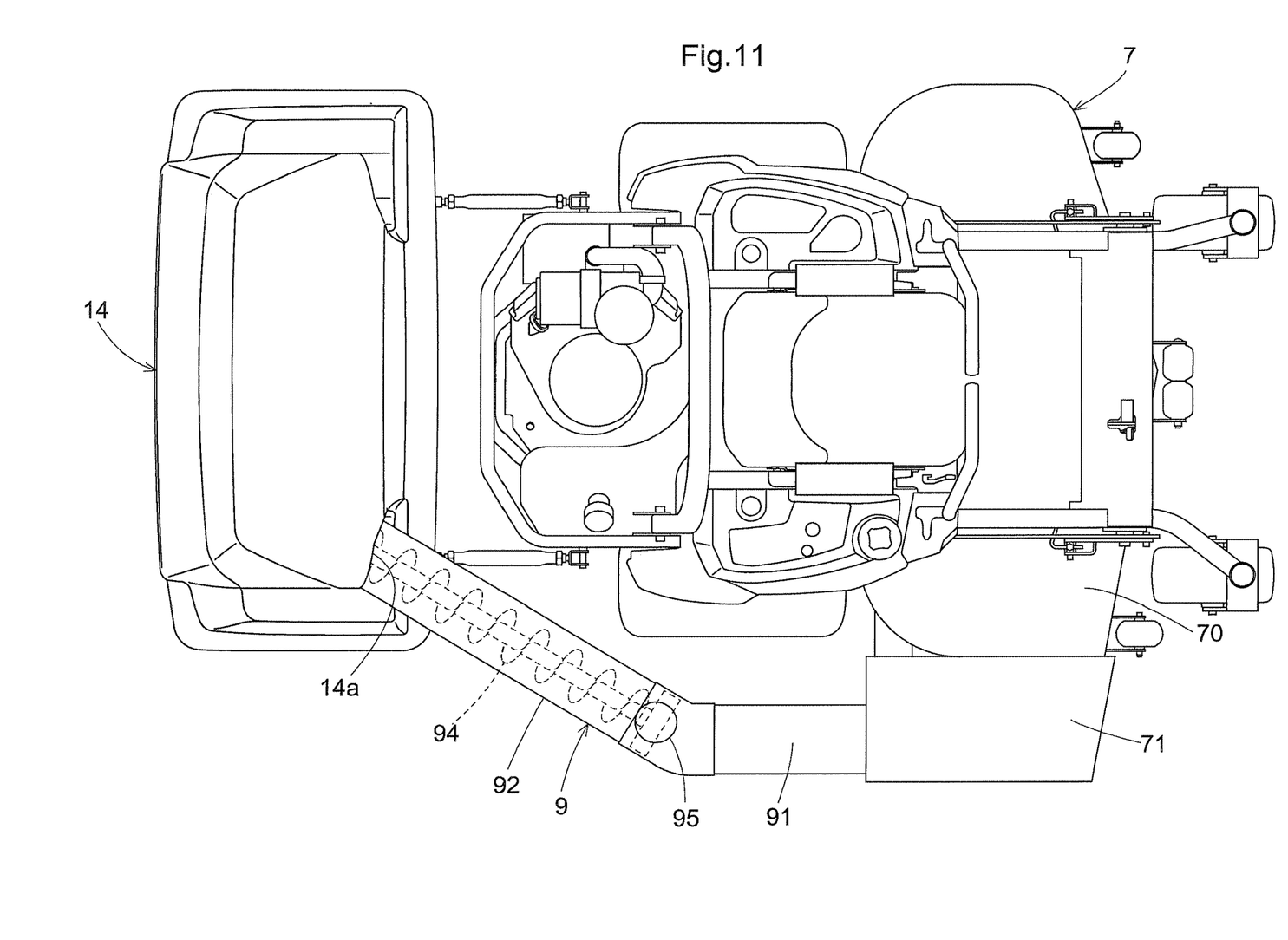
FIG. 11 is a plan view of the mower shown in FIG. 10.

In the above-described embodiment, grass clippings cut by the mower unit 7 are discharged onto and left on the grass-grown surface as they are. Instead of this, FIG. 11 and FIG. 12 show a mower configured to collect cut grass clippings. This mower includes a grass collecting container 14 for collecting cut grass clippings. The grass collecting container 14 is pivotally attached to a container supporting frame 11 attached to a rear portion of the vehicle body frame 1. Further, on the right side of the mower, there is provided a conveying duct 9 for conveying grass clippings from the mower deck 70 into the grass collecting container 14. The conveying duct 9 connects the discharge opening 71 of the mower deck 70 to an inlet opening 14a of the grass collecting container 14.

The conveying duct 9 is divided into a first conveying duct 91 on the side of the discharge opening 71 and a second conveying duct 92 on the side of the inlet opening 14a. The first conveying duct 91 incorporates a blower (not shown), so that grass clippings discharged through the discharge opening 71 of the mower deck 70 are sent into the second conveying duct 92 by wind generated by the blower. The second conveying duct 92 incorporates a screw conveyer 94 driven by an electric motor 95. Although the second conveying duct 92 is disposed with an ascending slope of about 30 degrees, cut grass clippings can be sent reliably into the grass connecting container 14 by means of the screw conveyer 94. As the driving source for the screw conveyer 94, the engine 20 may be employed instead of the electric motor 95. Incidentally, instead of the blower of the first conveying duct 91, a screw conveyer connected to the screw conveyer 94 may be employed. Namely, the conveying duct 9 as a whole will be constituted of a screw conveyer.

In the meantime, the arrangements disclosed in the foregoing embodiment (including the further embodiments) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A work vehicle comprising:
    a vehicle body frame extending in a vehicle body front/rear direction;
    a front wheel unit and a rear wheel unit attached to the vehicle body frame;
    a driver's seat disposed upwardly of the vehicle body frame; and
    a ROPS including;
        a pair of left and right lower portions fixed to the vehicle body frame,
        an upper portion supported to the lower portions to be pivotable between a vertical posture and a horizontal posture about a first pivot shaft and a second pivot shaft extending in a vehicle body transverse direction,
        an actuator unit including a motor directly connected to at least one of the first pivot shaft and the second pivot shaft,
        the motor configured to drive the at least one of the first pivot shaft and the second pivot shaft to pivot the upper portion between the vertical posture and the horizontal posture, and
        an operational tool for controlling the actuator unit, the operational tool being operable by a driver seated at the driver's seat.

2. The work vehicle of claim 1, further comprising:
    a lock device for locking the upper portion under the vertical posture upon completion of pivoting of the upper portion to the vertical posture.

3. The work vehicle of claim 2, wherein the lock device releases lock of the upper portion at time of start of pivoting of the upper portion from the vertical posture to the horizontal posture.

4. The work vehicle of claim 1, wherein:
    the actuator unit is fixed to at least one of the left and right lower portions, the upper portion is fixed to the at least one of the first and second pivot shaft, and
    the output shaft of the electric motor is directly connected to the at least one of the first and second pivot shafts and rotate together in unison.

5. The work vehicle of claim 1, wherein:
    the motor has an output shaft that is axially aligned with the at least one of the first pivot shaft and the second pivot shaft.

6. A work vehicle comprising:
    a vehicle body frame extending in a vehicle body front/rear direction;
    a front wheel unit and a rear wheel unit attached to the vehicle body frame;
    a driver's seat disposed upwardly of the vehicle body frame; and
    a ROPS including;
        a pair of left and right lower portions fixed to the vehicle body frame,
        an upper portion supported to the lower portions to be pivotable between a vertical posture and a horizontal posture about a pivot shaft extending in a vehicle body transverse direction,
        an actuator unit comprising an electrically powered cylinder,
        a wire mechanism configured to transmit a reciprocal movement of the electrically powered cylinder to the upper portion for pivoting the upper portion, and
        an operational tool for controlling the actuator unit, the operational tool being operable by a driver seated at the driver's seat.

7. The work vehicle of claim 6, further comprising:
    a lock device for locking the upper portion under the vertical posture upon completion of pivoting of the upper portion to the vertical posture.

8. The work vehicle of claim 7, wherein the lock device releases lock of the upper portion at time of start of pivoting of the upper portion from the vertical posture to the horizontal posture.

* * * * *

UNITED STATES PATENT AND TRADEMARK OFFICE
CERTIFICATE OF CORRECTION

| | | |
|---|---|---|
| PATENT NO. | : 11,007,963 B2 | Page 1 of 1 |
| APPLICATION NO. | : 16/233853 | |
| DATED | : May 18, 2021 | |
| INVENTOR(S) | : H. Tada | |

It is certified that error appears in the above-identified patent and that said Letters Patent is hereby corrected as shown below:

On the Title Page

Column 2, abstract (Line 5), please change "and and" to -- and --.

In the Claims

At Column 8, Line 20 (Claim 4, Line 4), please change "shaft" to -- shafts --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*